United States Patent
Yuan et al.

(10) Patent No.: US 8,991,167 B2
(45) Date of Patent: Mar. 31, 2015

(54) HYBRID HYDRAULIC SYSTEMS FOR INDUSTRIAL PROCESSES

(75) Inventors: QingHui Yuan, Maple Grove, MN (US); Ankur Ganguli, Plymouth, MN (US)

(73) Assignee: Eaton Corporation, Cleveland, OH (US)

( * ) Notice: Subject to any disclaimer, the term of this patent is extended or adjusted under 35 U.S.C. 154(b) by 739 days.

(21) Appl. No.: 13/273,573

(22) Filed: Oct. 14, 2011

(65) Prior Publication Data

US 2012/0090308 A1 Apr. 19, 2012

Related U.S. Application Data

(60) Provisional application No. 61/393,556, filed on Oct. 15, 2010.

(51) Int. Cl.
| | |
|---|---|
| *F16D 31/02* | (2006.01) |
| *F04B 49/00* | (2006.01) |
| *B29C 45/82* | (2006.01) |
| *F04B 49/10* | (2006.01) |

(52) U.S. Cl.
CPC .............. *F04B 49/002* (2013.01); *B29C 45/82* (2013.01); *F04B 49/10* (2013.01); *F04B 49/103* (2013.01)
USPC ................................... 60/413; 60/417; 60/468

(58) Field of Classification Search
USPC ............ 60/413, 417, 418, 464, 468, 403, 405
See application file for complete search history.

(56) References Cited

U.S. PATENT DOCUMENTS

| | | | |
|---|---|---|---|
| 2,817,489 A | 12/1957 | Hesmer | |
| 4,891,941 A | 1/1990 | Heintz | |
| 6,120,711 A | 9/2000 | Takizawa | |
| 6,148,947 A | 11/2000 | Eberhart et al. | |
| 6,167,701 B1 | 1/2001 | Hatcher et al. | |
| 6,216,456 B1 * | 4/2001 | Mitchell | 60/452 |
| 6,280,170 B1 * | 8/2001 | Furuya et al. | 425/145 |

(Continued)

FOREIGN PATENT DOCUMENTS

| | | |
|---|---|---|
| DE | 35 24 790 A1 | 1/1987 |
| DE | 101 52 198 A1 | 5/2003 |

(Continued)

OTHER PUBLICATIONS

Figures 1-6 and the Background Section of the present disclosure (U.S. Appl. No. 13/273,596).

(Continued)

*Primary Examiner* — Edward Look
*Assistant Examiner* — Daniel Collins
(74) *Attorney, Agent, or Firm* — Merchant & Gould P.C.

(57) ABSTRACT

A hydraulic drive system for driving a load includes a drive shaft; first and second hydraulic pumps driven by the drive shaft, and a control system that operates the hydraulic drive system in a plurality of modes including: a) a first mode where the second hydraulic pump pumps hydraulic fluid from a supply line to an accumulator; b) a second mode where the second hydraulic pump pumps hydraulic fluid from the accumulator to the supply line; c) a third mode where the second hydraulic pump pumps hydraulic fluid from the supply line to a reservoir; and d) a fourth mode where the second hydraulic pump pumps hydraulic fluid from the reservoir to the supply line. At least the second hydraulic pump is a variable displacement bidirectional pump.

20 Claims, 12 Drawing Sheets

(56) References Cited

U.S. PATENT DOCUMENTS

| | | |
|---|---|---|
| 6,878,317 B2 | 4/2005 | Kubota |
| 2003/0115863 A1 | 6/2003 | Holt et al. |
| 2005/0258795 A1 | 11/2005 | Choi |
| 2006/0070378 A1 | 4/2006 | Geiger |
| 2006/0075749 A1 | 4/2006 | Cherney et al. |
| 2007/0052137 A1 | 3/2007 | Tanemura et al. |
| 2007/0235892 A1 | 10/2007 | Zander et al. |
| 2008/0066989 A1 | 3/2008 | Edson et al. |
| 2008/0110166 A1* | 5/2008 | Stephenson et al. ............ 60/414 |
| 2008/0288115 A1 | 11/2008 | Rusnak et al. |
| 2009/0217653 A1 | 9/2009 | Zhang et al. |
| 2012/0093968 A1 | 4/2012 | Yuan |

FOREIGN PATENT DOCUMENTS

| | | |
|---|---|---|
| EP | 1 287 968 A2 | 3/2003 |
| JP | 2009-226448 | 10/2009 |

OTHER PUBLICATIONS

International Search Report and Written Opinion for International Application No. PCT/US2011/056414 mailed Jul. 2, 2013.

International Search Report and Written Opinion mailed Jan. 27, 2012.

Jaeger, A., "Hybridmaschine auf dem Prüfstand," *KU Kunststoffe*, vol. 90, No. 9, pp. 40-45 (2000).

* cited by examiner

FIG. 4

| Low Power (Power < T1) | Normal Power (T2 > Power > T1) | High Power (Power > T2) |
|---|---|---|
| Charge Mode / Dump Mode | Normal Mode | Discharge Mode | ately only and are not restrictive of the broad inventive
HYBRID HYDRAULIC SYSTEMS FOR INDUSTRIAL PROCESSES

CROSS REFERENCE TO RELATED APPLICATIONS

This application claims the benefit of U.S. Provisional Application No. 61/393,556, filed Oct. 15, 2010, and titled "Hybrid System for High Efficiency Industrial Processes," the disclosure of which is hereby incorporated herein by reference.

BACKGROUND

In some conventional hydraulic systems, a fixed displacement pump supplies fluid to one or more load sources. The load requirements of the load sources vary over the duty cycle. The fixed displacement pump is sized to accommodate the maximum load required during the duty cycle. Accordingly, the pump may be oversized for a significant portion of the duty cycle.

SUMMARY

Some aspects of the present disclosure relate to hydraulic systems having repeating duty cycles (i.e., work cycles). The hydraulic systems include at least a variable displacement pump and at least one accumulator to supply fluid to a load section of the system. A control system determines when the accumulator is charged and discharged. In certain implementations, the system also includes a fixed displacement pump coupled in series with the variable displacement pump.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 4 is a chart showing which drive modes correspond with which load requirements;

DETAILED DESCRIPTION

Figure 1:
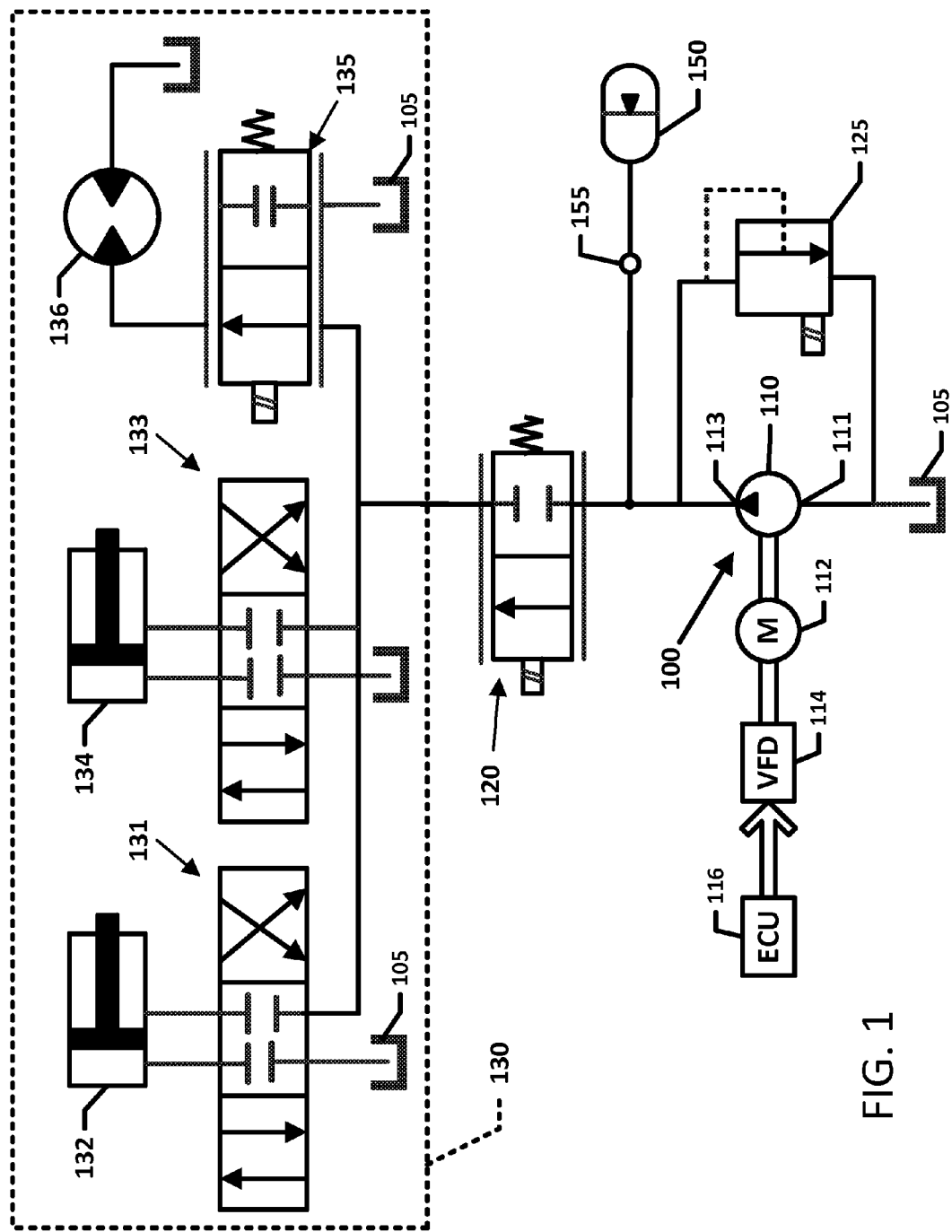
FIG. 1 is a hydraulic circuit diagram showing a fixed displacement pump that is configured to supply fluid flow to a load section of an example hydraulic system in accordance with the principles of the present disclosure.

FIG. 1 is a hydraulic circuit diagram showing a hydraulic drive circuit 100 for powering operation of a load section 130 having a repeating work cycle (e.g., an injection molding machine). The drive circuit 100 includes a fixed displacement pump 110 that is configured to supply fluid flow to the load section 130 of an example hydraulic system. An electronic control unit (ECU) 116 manages the VFD 114.

The pump 110 has an inlet 111 and an outlet 113. The inlet 111 connects to a reservoir 105 (i.e., a tank) and the outlet 113 connects to a flow control valve 120 and a relief valve 125. A motor 112 (e.g., an electric motor) having a variable frequency driver (VFD) 114 drives the pump 110 to draw fluid from the reservoir 105 and provide variable fluid flow to the system. The relief valve 125 controls the pump outlet pressure (i.e., the hydraulic system pressure) by passing extra flow to the reservoir 105. The flow control valve 120 controls the flow rate of the hydraulic fluid provided to the actuators. In certain implementations, the flow control valve 120 and relief valve 125 are proportional valves.

In the example shown, the load section 130 includes a first load source 132, a second load source 134, and a third load source 136. In other implementations, the hydraulic system may have a greater or lesser number of load sources. In certain implementations, each load source 132, 134, 136 includes a machine actuator (e.g., an injection machine, a clamp, a screw, etc.). Each of the actuators 132, 134, 136 is connected to the flow control valve 120 through a valve 131, 133, 135, respectively. In the example shown, the first valve 131 and the second valve 133 are three-position valves and the third valve 135 is a two-position proportional valve. In other implementations, however, the valves 131, 133, 135 may have any desired number of states.

Each of the actuators 132, 134, 136 switches between an active state, in which the actuator 132, 134, 136 requires fluid flow from the pump 110, and an inactive state, in which the actuator 132, 134, 136 is isolated from the pump 110. The valves 131, 133, 135 are used to open and close fluid communication with the actuators 132, 134, 136. In some implementations, only one load source 132, 134, 136 is active at any one time. In other implementations, multiple actuators 132, 134, 136 may be active simultaneously. In certain implementations, the actuators 132, 134, 136 perform iterative tasks so that the load required by each actuator 132, 134, 136 varies in accordance with a duty cycle.

For example, in some implementations, the hydraulic system includes an injection molding system. In some such systems, the first load source 132 includes a hydraulic cylinder powering a clamp, the second load source 134 includes a hydraulic cylinder that axially moves an auger of an injector, and the third load source 136 includes a hydraulic motor that rotates that auger of the injector. In other implementations, however, each load source 132, 134, 136 may include any desired type of hydraulic actuator. While the machine load section 130 is depicted as an injection molding machine, it will be appreciated that aspects of the present disclosure are applicable to any type of hydraulic powered machine. In particular, aspects of the present disclosure are suited for hydraulic machines having repeating work cycles where the hydraulic pressure load and hydraulic flow load demanded by the machines over the work cycles vary according to pre-defined profiles.

The hydraulic drive circuit 100 has an architecture that enables power generation and power consumption to be effectively matched, thereby reducing throttling power losses. In some implementations, one or more accumulators 150 may be connected to the hydraulic drive circuit 100 upstream of the flow control valve 120. In other implementations, one or more accumulators 150 may be connected to the hydraulic drive circuit 100 in parallel with the flow control valve 120. For example, disclosure of one such parallel architecture drive circuit may be found in copending U.S. application Ser. No. 13/273,596, filed herewith, and titled "Hydraulic Drive Circuit with Parallel Architectured Accumulator," which claims the benefit of U.S. Provisional Application No. 61/393,968, filed Oct. 18, 2010, and titled "Parallel Architectured Intelligent Accumulator (PAIA) for Energy Saving," the disclosures of both of which are hereby incorporated herein by reference.

Generally, the VFD 114 drives the pump 110 to supply fluid having a particular pressure and flow rate to the load section 130. During the times in the duty cycle when the load is below a first predetermined threshold, a valve arrangement 155 directs a portion of the pumped fluid to charge the accumulator 150. During the times in the duty cycle when the required load is above a second predetermined threshold, the valve arrangement 155 discharges the accumulator 150 to direct additional fluid flow to the load section 130.

The accumulator 150 is isolated from the remainder of the hydraulic system (e.g., by valve arrangement 155) when the load requirement is between the first and second thresholds. The motor 112, VFD 114, and pump 110 operate in regular form when the accumulator 150 is isolated. In certain implementations, the first and second thresholds are set so that the accumulator 150 is isolated from the remainder of the hydraulic system over a significant portion of the duty cycle. In some implementations, the first and second predetermined thresholds are set experimentally based on the duty cycle and load requirements of a particular system.

Figure 2:
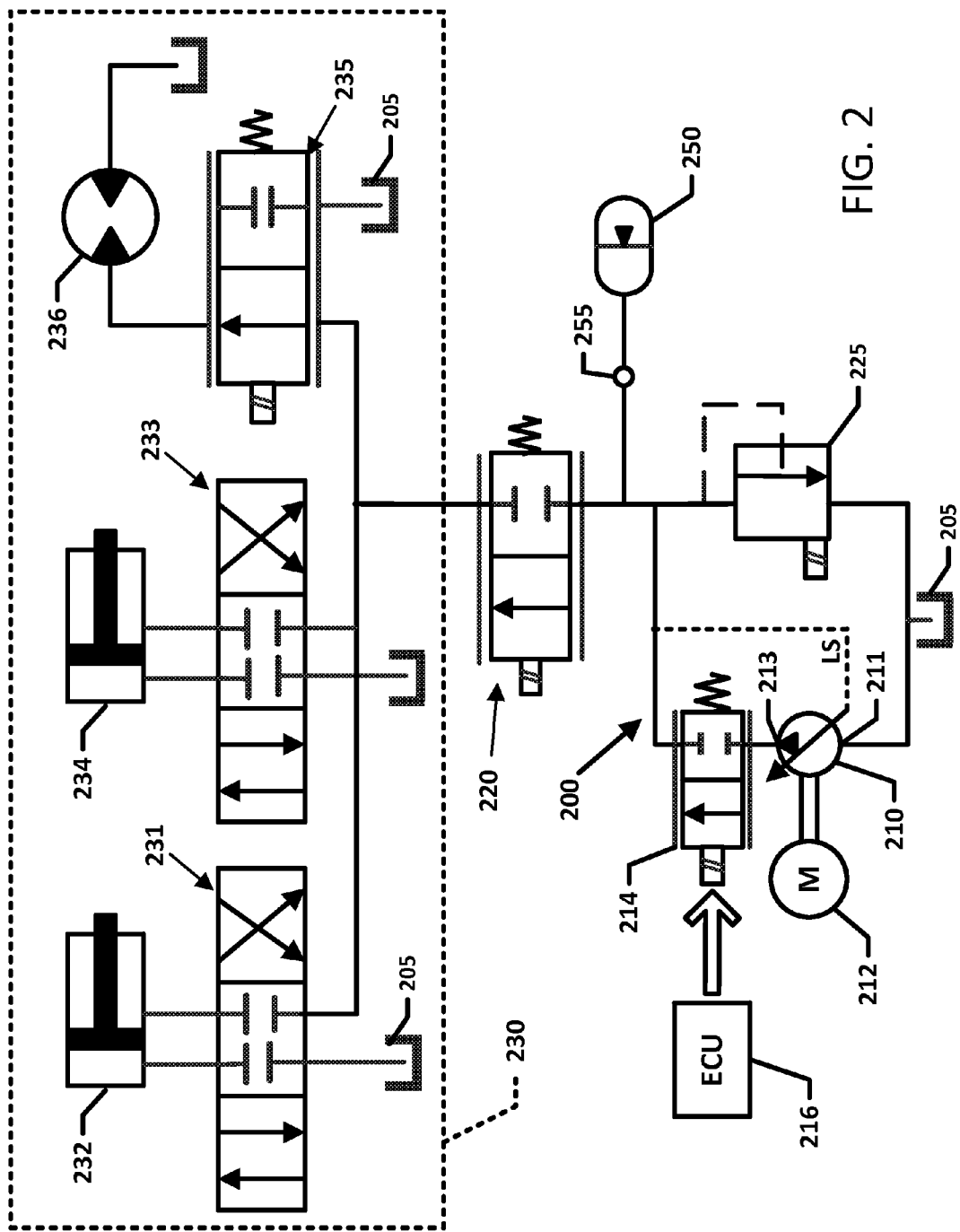
FIG. 2 is a hydraulic circuit diagram showing a variable displacement pump that is configured to supply fluid flow to a load section of another example hydraulic system in accordance with the principles of the present disclosure.

FIG. 2 is a hydraulic circuit diagram showing a hydraulic drive circuit 200 for powering operation of a load section 230 having a repeating work cycle (e.g., an injection molding machine). The drive circuit 200 includes a variable displacement pump 210 that is configured to supply fluid flow to a load section 230 of another example hydraulic system. The pump 210 has an inlet 211 and an outlet 213. The variable displacement pump 210 draws fluid from a supply tank 205 through the inlet 211. An ECU 216 controls a proportional valve 214 to selectively provide fluid flow from the outlet 213 to the system. The pump 210, which is driven by motor (e.g., an electric motor) 212, varies the fluid flow based on a load sense signal LS. A proportional valve 220 downstream from the proportional valve 214 connects the variable displacement pump 210 to the load section 230. A proportional relief valve 225 allows excess fluid from the variable displacement pump 210 to return to the tank 205.

In the example shown, the load section 230 includes a first load source 232, a second load source 234, and a third load source 236. In other implementations, the hydraulic system may have a greater or lesser number of load sources. In certain implementations, each load source 232, 234, 236 includes a machine actuator (e.g., an injection machine, a clamp, a screw, etc.). Each of the actuators 232, 234, 236 is connected to the flow control valve 220 through a valve 231, 233, 235, respectively. In the example shown, the first valve 231 and the second valve 233 are three-position valves and the third valve 235 is a two-position proportional valve. In other implementations, however, the valves 231, 233, 235 may have any desired number of states.

Each of the actuators 232, 234, 236 switches between an active state, in which the actuator 232, 234, 236 requires fluid flow from the pump 210, and an inactive state, in which the actuator 232, 234, 236 is isolated from the pump 210. The valves 231, 233, 235 are used to open and close fluid communication with the actuators 232, 234, 236. In some implementations, only one load source 232, 234, 236 is active at any one time. In other implementations, multiple actuators 232, 234, 236 may be active simultaneously. In certain implementations, the actuators 232, 234, 236 perform iterative tasks so that the load required by each actuator 232, 234, 236 varies in accordance with a duty cycle.

For example, in some implementations, the hydraulic system includes an injection molding system. In some such systems, the first load source 232 includes a hydraulic cylinder powering a clamp, the second load source 234 includes a hydraulic cylinder that axially moves an auger of an injector, and the third load source 236 includes a hydraulic motor that rotates that auger of the injector. In other implementations, however, each load source 232, 234, 236 may include any desired type of hydraulic actuator. While the machine load section 230 is depicted as an injection molding machine, it will be appreciated that aspects of the present disclosure are applicable to any type of hydraulic powered machine. In particular, aspects of the present disclosure are suited for hydraulic machines having repeating work cycles where the hydraulic pressure load and hydraulic flow load demanded by the machines over the work cycles vary according to predefined profiles.

The hydraulic drive circuit 200 has an architecture that enables power generation and power consumption to be effectively matched, thereby reducing throttling power losses. An accumulator 250 is connected to the hydraulic drive circuit 200 upstream of the proportional valve 220 and downstream of the proportional relief valve 225. In some implementations, one or more accumulators 250 may be connected to the hydraulic drive circuit 200 upstream of the flow control valve 220. In other implementations, one or more accumulators 250 may be connected to the hydraulic drive circuit 200 in parallel with the flow control valve 220. For example, disclosure of one such parallel architecture drive circuit may be found in copending U.S. application Ser. No. 13/273,596, filed herewith, and titled "Hydraulic Drive Circuit with Parallel Architectured Accumulator," which claims the benefit of U.S. Provisional Application No. 61/393,968, filed Oct. 18, 2010, and titled "Parallel Architectured Intelligent Accumulator (PAIA) for Energy Saving," the disclosures of both of which are incorporated by reference above.

Generally, the variable displacement pump 210 supplies an appropriate fluid flow to the load section 230 of the hydraulic system 200 based on the load sense control signal LS. During the times in the duty cycle when the required load is below a first predetermined threshold, a valve arrangement 255 directs a portion of the pumped fluid to charge the accumulator 250. During the times in the duty cycle when the required load is above a second predetermined threshold, the valve arrangement 255 discharges the accumulator 250 to direct additional fluid flow to the load section 230.

The accumulator 250 is isolated from the rest of the hydraulic system by the valve arrangement 255 when the load requirement is between the first and second thresholds. The variable displacement pump 210 operates in regular form when the accumulator 250 is isolated. In certain implementations, the first and second thresholds are set so that the accumulator 250 is isolated from the rest of the hydraulic system 200 over a significant portion of the duty cycle. In some implementations, the first and second predetermined thresholds are set experimentally based on the duty cycle and load requirements of a particular system.

Figure 3:
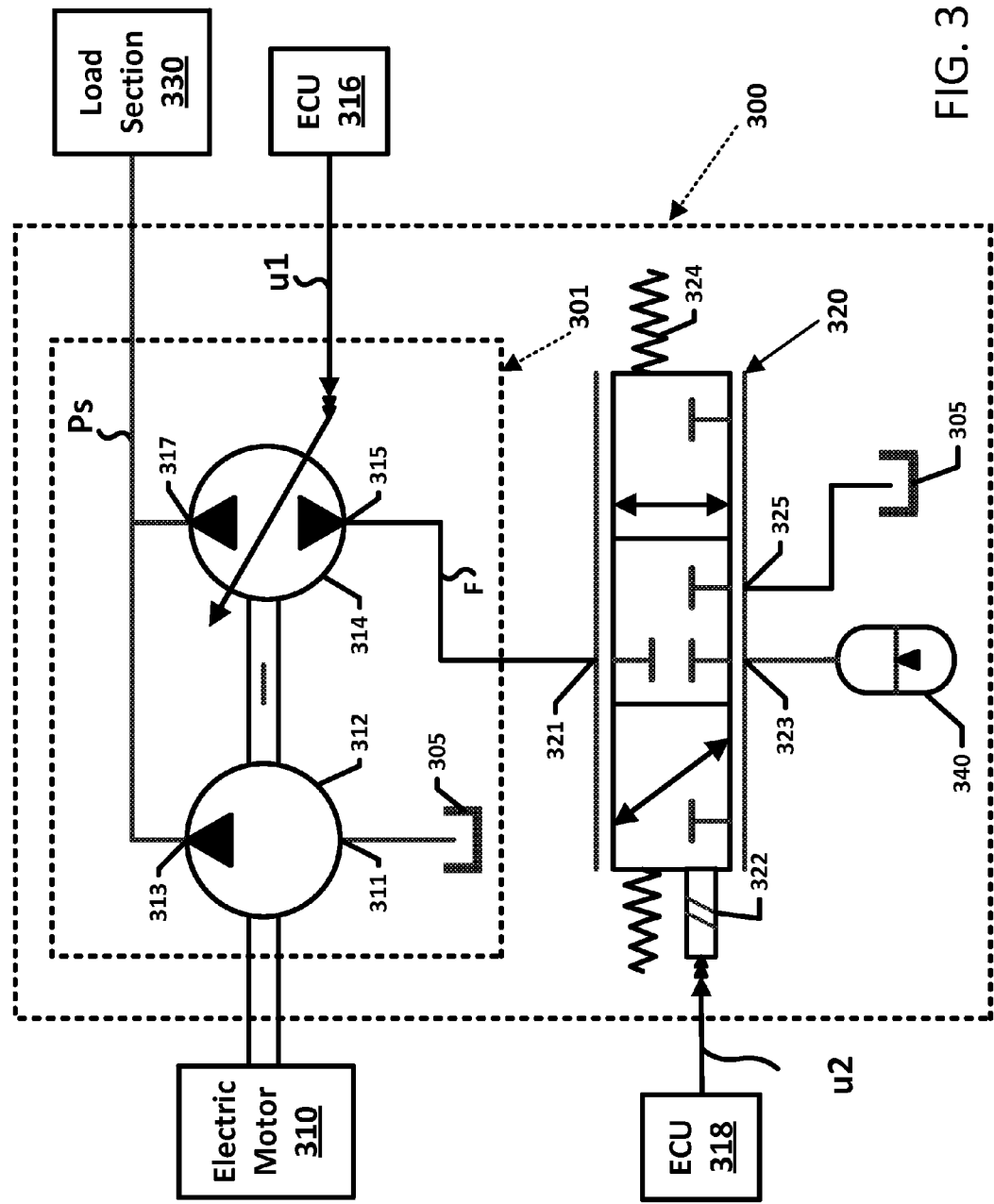
FIG. 3 is a hydraulic circuit diagram showing a variable displacement pump arrangement that is configured to supply fluid flow along a supply line to a load section of another example hydraulic system in accordance with the principles of the present disclosure.

FIG. 3 is a hydraulic circuit diagram showing a hydraulic drive circuit 300 for powering operation of a load section 330 having a repeating work cycle (e.g., an injection molding machine). The drive circuit 300 includes a variable displacement pump arrangement 301 that is configured to supply fluid flow along a supply line $P_S$ to a load section 330 of another example hydraulic system. In some implementations, the load section 330 is the same as load section 130 of FIG. 1 or load section 230 of FIG. 2. In other implementations, however, the load section 330 may include any desired number and/or type of load sources. The variable displacement pump arrangement 300 draws the fluid from a reservoir 305 and dumps excess fluid to the reservoir 305.

The variable pump arrangement 300 includes a motor (e.g., an electric motor) 310 driving at least a first pump 312 and a second pump 314 via a drive shaft 319. At least the second pump 314 is a bi-directional pump. In certain implementations, the second pump 314 is a variable displacement pump. In the example shown, the first pump 312 is a fixed displacement, single direction pump. In other implementations, the first pump 312 may be a variable displacement pump. In still other implementations, the pump arrangement 300 may include additional pumps (e.g., fixed displacement pumps and/or variable displacement pumps). The pumps 312, 314 of the pump arrangement 300 are connected in series to the supply line $P_S$.

The motor 310 constantly drives the first pump 312 to draw fluid from the tank 305 through a pump inlet 311 and to supply the fluid from a pump outlet 313 to the load section 330. The bi-directional, variable displacement pump 314 has a first port 315 and a second port 317. The motor 310 also constantly drives the variable displacement pump 314 along with the first pump 312. However, since the variable displacement pump 314 is bi-directional, each of the ports 315, 317 may alternately function as an inlet port and an outlet port.

An ECU 316 provides a control signal U1 that controls when the variable displacement pump 314 directs fluid in a first direction and when the second pump 314 directs fluid in a second direction. When the control signal U1 causes the second pump 314 to direct fluid in the first direction, the second pump 314 directs fluid from the pump supply line $P_S$ (i.e., fluid obtained from the tank 305 by the first pump 312), through the second port 317, through the first port 315 to a feeder line F. When the control signal U1 causes the second pump 314 to direct fluid in the second direction, however, the second pump 314 directs fluid from the feeder line F, through the first port 315, through the second port 317, to the pump supply line $P_S$.

A three-position directional valve 320 selectively couples the feeder line F to the tank 305 and to an accumulator arrangement including at least one accumulator 340. Certain types of directional valves 320 also will selectively isolate the feeder line F from both the tank 305 and the accumulator arrangement. The directional valve 320 includes a feeder port 321, an accumulator port 323, and a reservoir port 325. In the example shown, the directional valve 320 is configured to move between three positions. In a neutral (e.g., middle) position, the directional valve 320 does not connect any of the ports 321, 323, 325. Accordingly, the valve 320 does not fluidly couple the feeder line F to either the accumulator arrangement or the tank 305. When moved to the left, the directional valve 320 connects the feeder port 321 to the accumulator port 323, thereby fluidly coupling the feeder line F to the accumulator arrangement. When moved to the right, the directional valve 320 connects the feeder port 321 to the reservoir port 325, thereby fluidly coupling the feeder line F to the reservoir 305.

In the example shown in FIG. 3, the accumulator arrangement includes one accumulator 340. In other implementations, however, the accumulator arrangement may include an array of accumulators as shown in copending U.S. application Ser. No. 13/273,596, filed herewith, and titled "Hydraulic Drive Circuit with Parallel Architectured Accumulator," the disclosures of both of which are incorporated by reference above. This application also discloses a parallel architecture for the accumulator arrangement that may be utilized in the drive circuit 300.

In certain implementations, the directional valve 320 is moved by a solenoid 322, which is controlled by a control signal U2 generated by an ECU 318. In some implementations, the ECU 318 is the same as ECU 316. In other implementations, two separate ECUs 316, 318 may be provided. In certain implementations, the directional valve 320 also may be spring-biased in one or both directions (see springs 324).

Generally, the first pump 312 and the second pump 314 cooperate to provide fluid to the supply line $P_S$ for use by the load section 330. The first pump 312 supplies a constant fluid flow from the tank 305 to the load section 330. The second pump 314 directs fluid from the reservoir 305 to the power supply line $P_S$, directs fluid from the accumulator 340 to the power supply line $P_S$, directs some of the fluid output from the first pump 312 to the accumulator 340, or directs fluid from the pump 314 to the reservoir 305 depending on a drive mode of the drive circuit 300. The drive mode changes based on the load required at any given time in the duty cycle.

FIG. 4 is a chart showing which drive modes correspond with which load requirements. As shown, when the load section 330 has a low load requirement (e.g., when the load requirement of the load section 330 is less than a first threshold T1), the ECU 316 provides a control signal U1 instructing the second pump 314 to direct fluid in the first direction to the feeder line F from the supply line $P_S$. During a low power requirement, the drive circuit 300 may be configured into either a charge mode or a dump mode. When configured in the charge mode, the ECU 318 provides a control signal U2 instructing directional valve 320 to connect the feeder line F to the accumulator 340. When configured in the dump mode, the ECU 318 provides a control signal U2 instructing directional valve 320 to connect the feeder line F to the reservoir 305.

When the load section 330 has a normal load requirement (e.g., when the load requirement of the load section 330 is more than a first threshold T1 and less than a second threshold T2), the ECU 316 provides a control signal U1 instructing the second pump 314 to direct fluid in the second direction to the supply line $P_S$ from the feeder line F. The ECU 318 provides a control signal U2 instructing directional valve 320 to connect the feeder line F to the reservoir 305. Accordingly, the second pump 314 is effectively drawing fluid from the tank 305 and directing the fluid to the supply line $P_S$ in addition to the fluid being supplied by the first pump 312.

When the load section 330 has a high load requirement (e.g., when the load requirement of the load section 330 is greater than the second threshold T2), the ECU 316 provides a control signal U1 instructing the second pump 314 to direct fluid in the second direction from to the supply line $P_S$ from the feeder line F. The ECU 318 provides a control signal U2 instructing directional valve 320 to connect the feeder line F to the accumulator 340. Accordingly, the second pump 314 is effectively drawing fluid from the accumulator 340 and directing the fluid to the supply line $P_S$ in addition to the fluid being supplied by the first pump 312.

Figure 5:
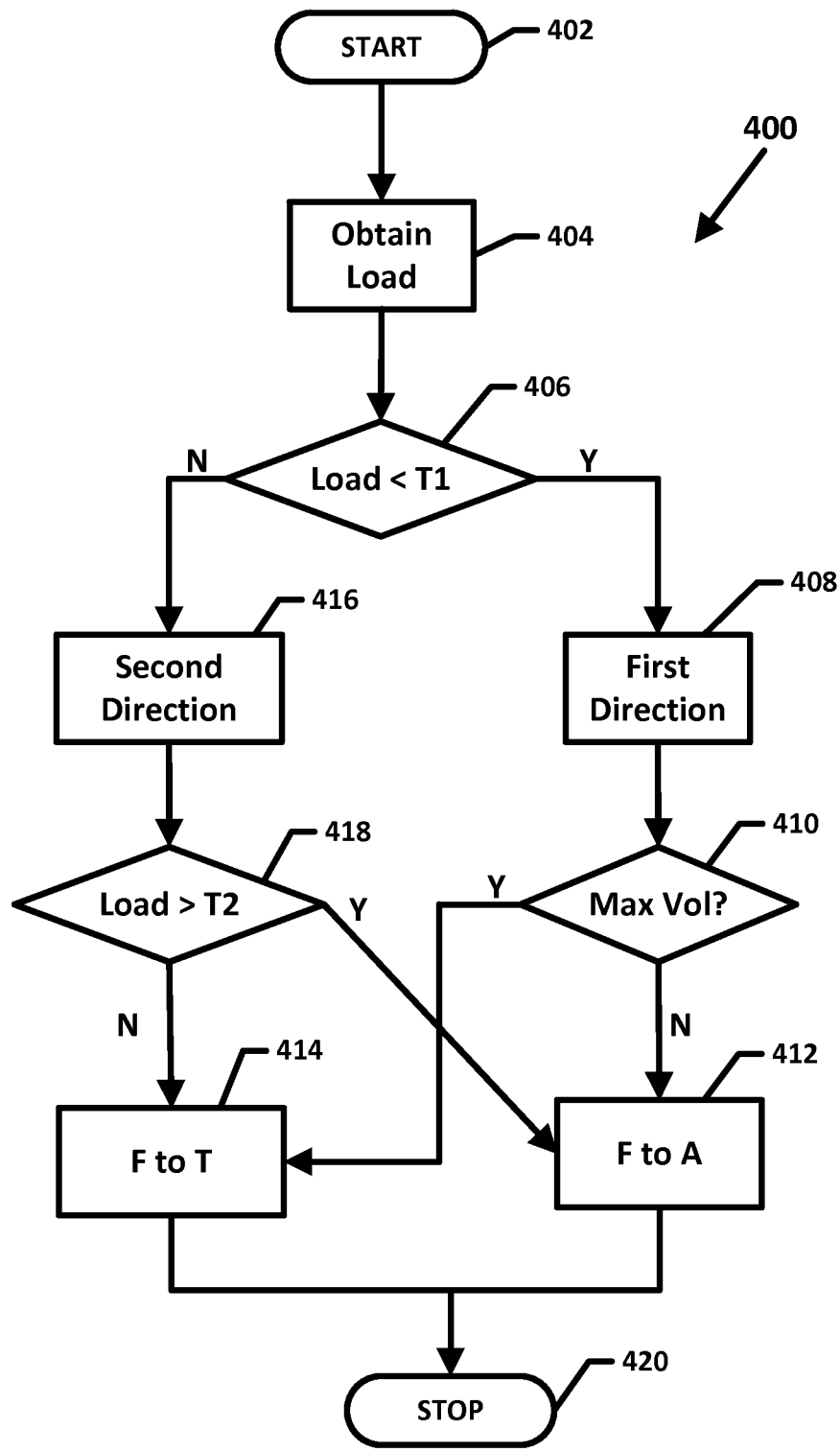
FIG. 5 is a flowchart illustrating an operational flow for an example control process 400 by which drive circuit of FIG. 3 may be operated.

FIG. 5 is a flowchart illustrating an operational flow for an example control process 400 by which drive circuit 300 of FIG. 3 may be operated. In some implementations, the example control process 400 is implemented by one or more electronic control units (e.g., the ECU 316 and ECU 318 of FIG. 3). In other implementations, the example control process 400 may be executed by any other electronic processor. The example control process 400 begins at a start module 402, performs any appropriate initialization procedures, and proceeds to an obtain operation 404.

The obtain operation 404 determines the current load requirement for the hydraulic system. In some implementations, the obtain operation 404 compares a clock time to a predetermined duty cycle of the hydraulic system. In other implementations, the obtain operation 404 receives a control signal indicating the current status of the system relative to a predetermined duty cycle. In other implementations, the obtain operation 404 measures fluid pressure and fluid flow using one or more sensors within the hydraulic system.

A first determination module 406 determines whether or not the current load requirement is less than a first predetermined threshold T1. If the current load requirement is less than the first predetermined threshold T1, then a first pump position operation 408 causes the second pump 314 to direct fluid in the first direction. For example, the ECU 316 may send a control signal U1 to the second pump 314 to cause the second pump 314 to direct fluid from the supply line $P_S$ to the feeder line F.

A second determination module 410 determines whether the accumulator (e.g., accumulator 340 of FIG. 3) is filled to capacity. If the accumulator 340 is not filled to capacity, then a first valve position operation 412 moves the directional valve 320 to connect the feeder line F to the accumulator 340 for charging. For example, the ECU 318 may direct a solenoid to 322 to move the directional valve 320 of FIG. 3 towards the left. Accordingly, the second pump 314 draws fluid from the supply line $P_S$ and pumps the fluid to the accumulator 340 through the feeder line F. The control process 400 performs any appropriate completion procedures and ends at a stop module 420.

Figure 6:
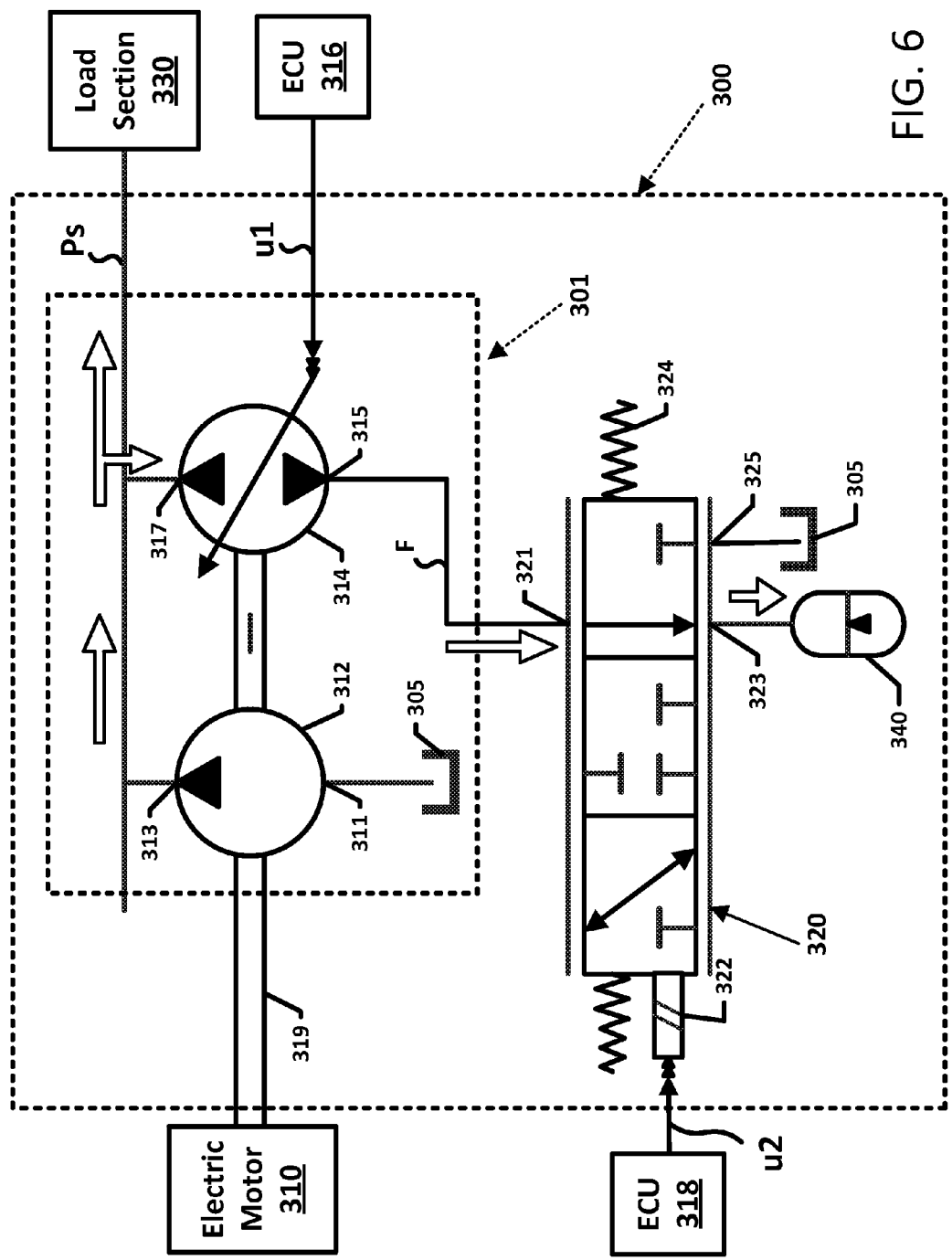
FIG. 6 is a circuit diagram showing fluid flow through the drive circuit when the drive circuit is configured in the charge mode.

For example, FIG. 6 is a circuit diagram showing fluid flow through the drive circuit 300 when the drive circuit 300 is configured in the charge mode. In FIG. 6, the ECU 316 has instructed the second pump 314 to direct fluid from the supply line $P_S$ to the feeder line F. The ECU 318 has instructed the solenoid to 322 to move the directional valve 320 to connect the feeder line port 321 to the accumulator port 325. Accordingly, fluid flows from the first pump 312 to the supply line $P_S$. Some of the fluid from the first pump 312 is drawn by the second pump 314 from the supply line $P_S$ and directed to the accumulator 340. Since the fluid is flowing in the first direction, the valve connection is shown in FIG. 6 to extend from the feeder port 321 to the accumulator port 323. It will be understood, however, that the connection is bidirectional based on the direction of the second pump 314.

Referring back to FIG. 5, if the second determination module 410 determines that the accumulator 340 is filled to capacity, however, then a second valve position operation 414 moves the directional valve 320 to connect the feeder line F to the reservoir 305. For example, the ECU 318 may direct a solenoid to 322 to move the directional valve 320 of FIG. 3 towards the right. Accordingly, the second pump 314 draws fluid from the supply line $P_S$ and dumps the fluid to the tank 305 through the feeder line F. The control process 400 performs any appropriate completion procedures and ends at a stop module 420.

Figure 7:
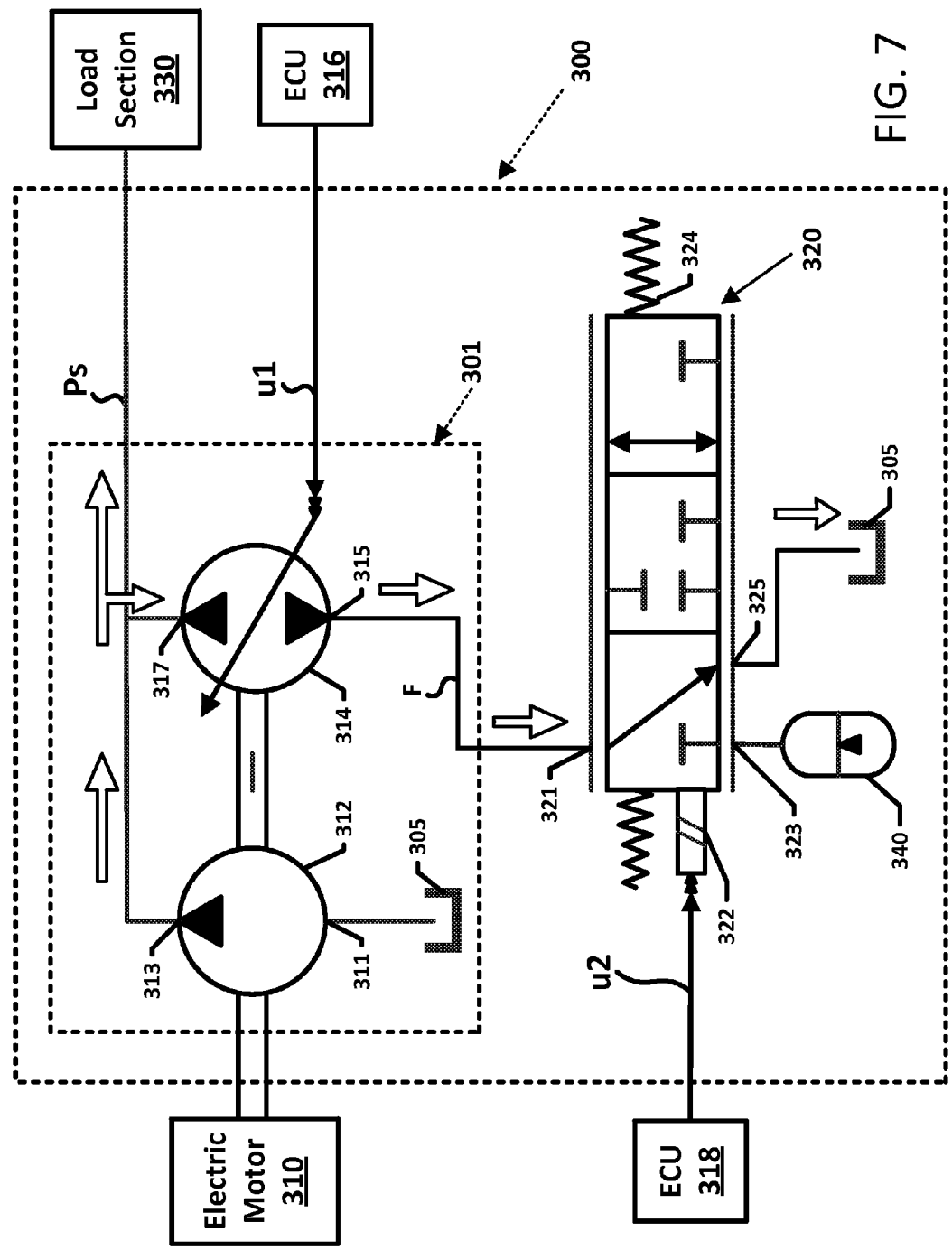
FIG. 7 is a circuit diagram showing fluid flow through the drive circuit when the drive circuit is configured in the dump mode.

For example, FIG. 7 is a circuit diagram showing fluid flow through the drive circuit 300 when the drive circuit 300 is configured in the dump mode. In FIG. 7, the ECU 316 has instructed the second pump 314 to direct fluid from the supply line $P_S$ to the feeder line F. The ECU 318 has instructed the solenoid to 322 to move the directional valve 320 to connect the feeder port 321 to the reservoir port 325. Since the fluid is flowing in the first direction, the valve connection is shown in FIG. 7 to extend from the feeder port 321 to the reservoir port 325. It will be understood, however, that the connection is bidirectional based on the direction of the second pump 314.

In the example drive system 300 shown in FIG. 7, fluid flows from the first pump 312 to the supply line $P_S$. Some of the fluid from the first pump 312 is drawn by the second pump 314 from the supply line $P_S$ and directed to the reservoir 305. Alternatively, in other implementations, the ECU 316 may instruct the second pump 314 to pump fluid in the second direction to draw fluid from the reservoir 305. In still other implementations, the ECU 318 may move the valve 320 to isolate both the accumulator 340 and the reservoir 305 from the feeder line F.

Referring back to FIG. 5, if the first determination module 406 determines that the current load requirement exceeds the first threshold, however, then a second pump position operation 416 causes the second pump 314 to direct fluid in the second direction. For example, the ECU 316 may send a control signal U1 to the second pump 314 to cause the second pump 314 to direct fluid from the feeder line F to the supply line $P_S$.

A third determination module 418 determines whether or not the current load requirement exceeds a second predetermined threshold T2. If the current load requirement does not exceed the second threshold, then the second valve position operation 414 moves the directional valve 320 to connect the feeder line F to the tank 305. The second pump 314 draws fluid from the tank 305 through the feeder line F and pushes the fluid into the supply line $P_S$. Accordingly, first and second pumps 312, 314 cooperate to supply fluid from the reservoir 305 to the load section 330. The control process 400 performs any appropriate completion procedures and ends at a stop module 420.

Figure 8:
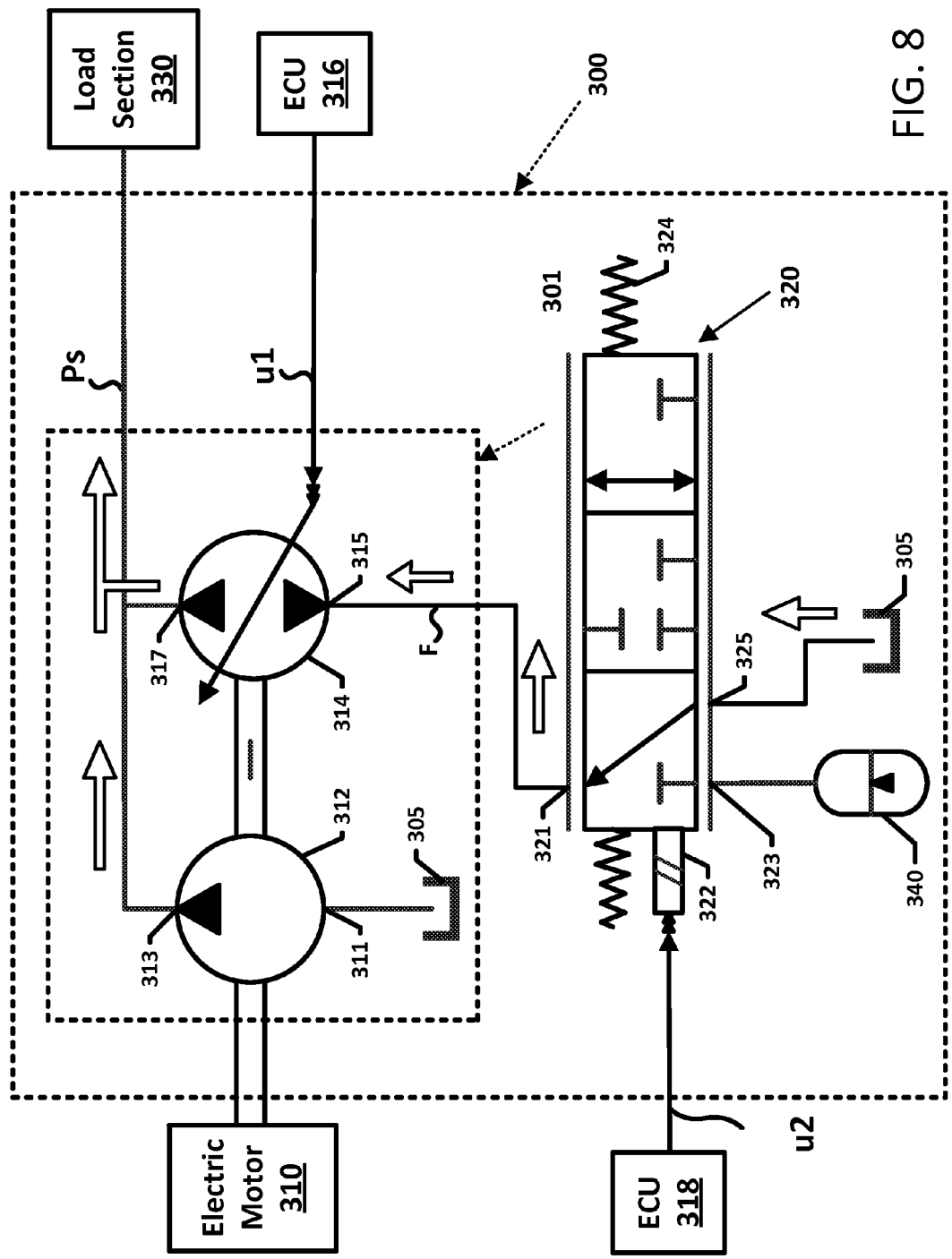
FIG. 8 is a circuit diagram showing fluid flow through the drive circuit when the drive circuit is configured in the normal mode.

For example, FIG. 8 is a circuit diagram showing fluid flow through the drive circuit 300 when the drive circuit 300 is configured in the normal mode. In FIG. 8, the ECU 316 has instructed the second pump 314 to direct fluid from the feeder line F to the supply line $P_S$. The ECU 318 has instructed the solenoid to 322 to move the directional valve 320 to connect the feeder port 321 to the reservoir port 325. Accordingly, fluid flows from the first pump 312 and from the second pump 314 to the supply line $P_S$. The second pump 314 draws the fluid from the reservoir 305.

If the current load requirement does exceed the second threshold, however, then the first valve position operation 412 moves the directional valve 320 to connect the feeder line F to the accumulator 340 for discharging. Accordingly, the second pump 314 draws fluid from the accumulator 340 through the feeder line F and pumps the fluid into the supply line $P_S$. The control process 400 performs any appropriate completion procedures and ends at a stop module 420.

Figure 9:
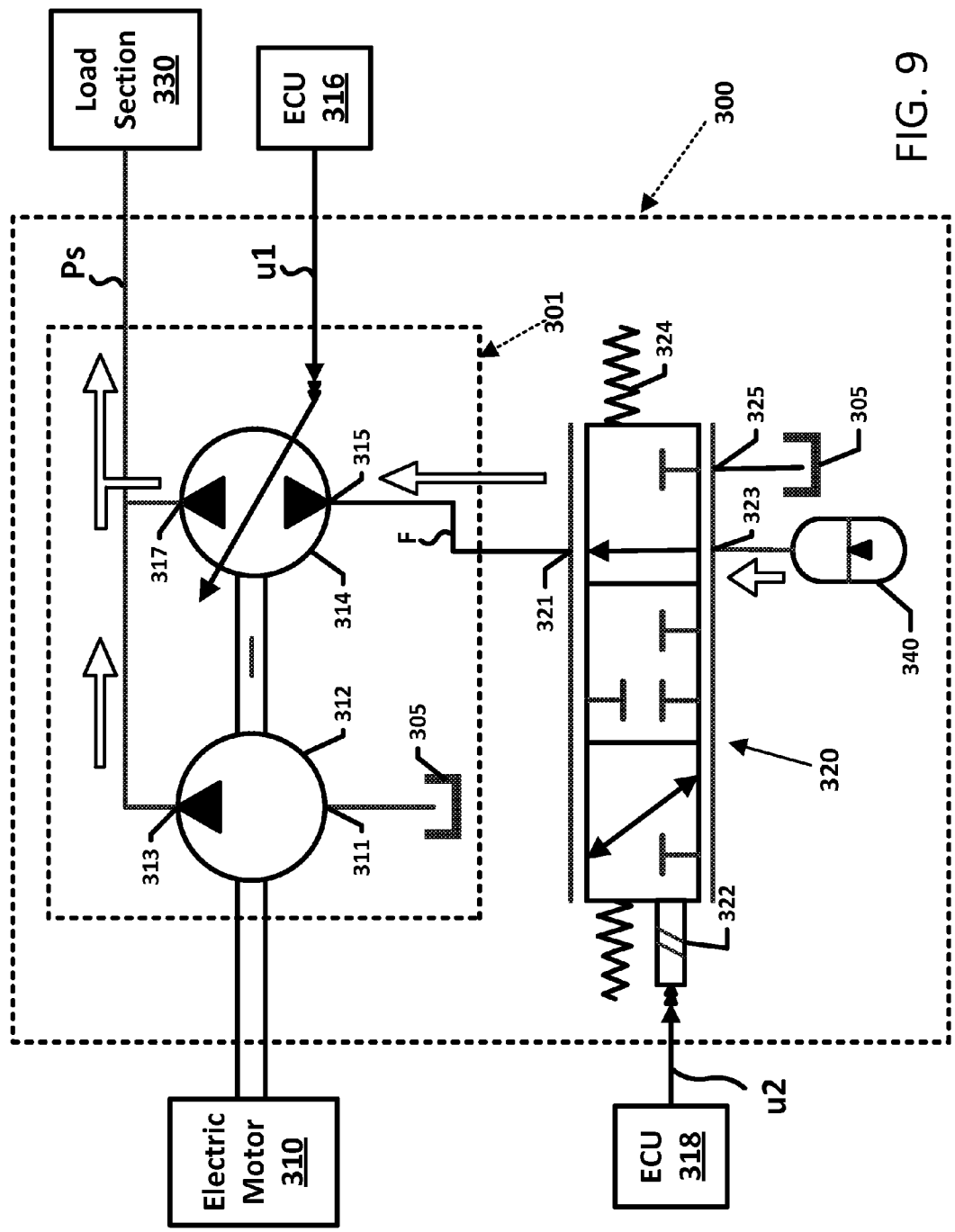
FIG. 9 is a circuit diagram showing fluid flow through the drive circuit when the drive circuit is configured in the discharge mode.

For example, FIG. 9 is a circuit diagram showing fluid flow through the drive circuit 300 when the drive circuit 300 is configured in the discharge mode. In FIG. 9, the ECU 316 has instructed the second pump 314 to direct fluid from the feeder line F to the supply line $P_S$. The ECU 318 has instructed the solenoid to 322 to move the directional valve 320 to connect the feeder line port 321 to the accumulator port 323. Accordingly, fluid flows from the first pump 312 and from the second pump 314 to the supply line $P_S$. The second pump 314 draws the fluid from the accumulator 340.

Figure 10:
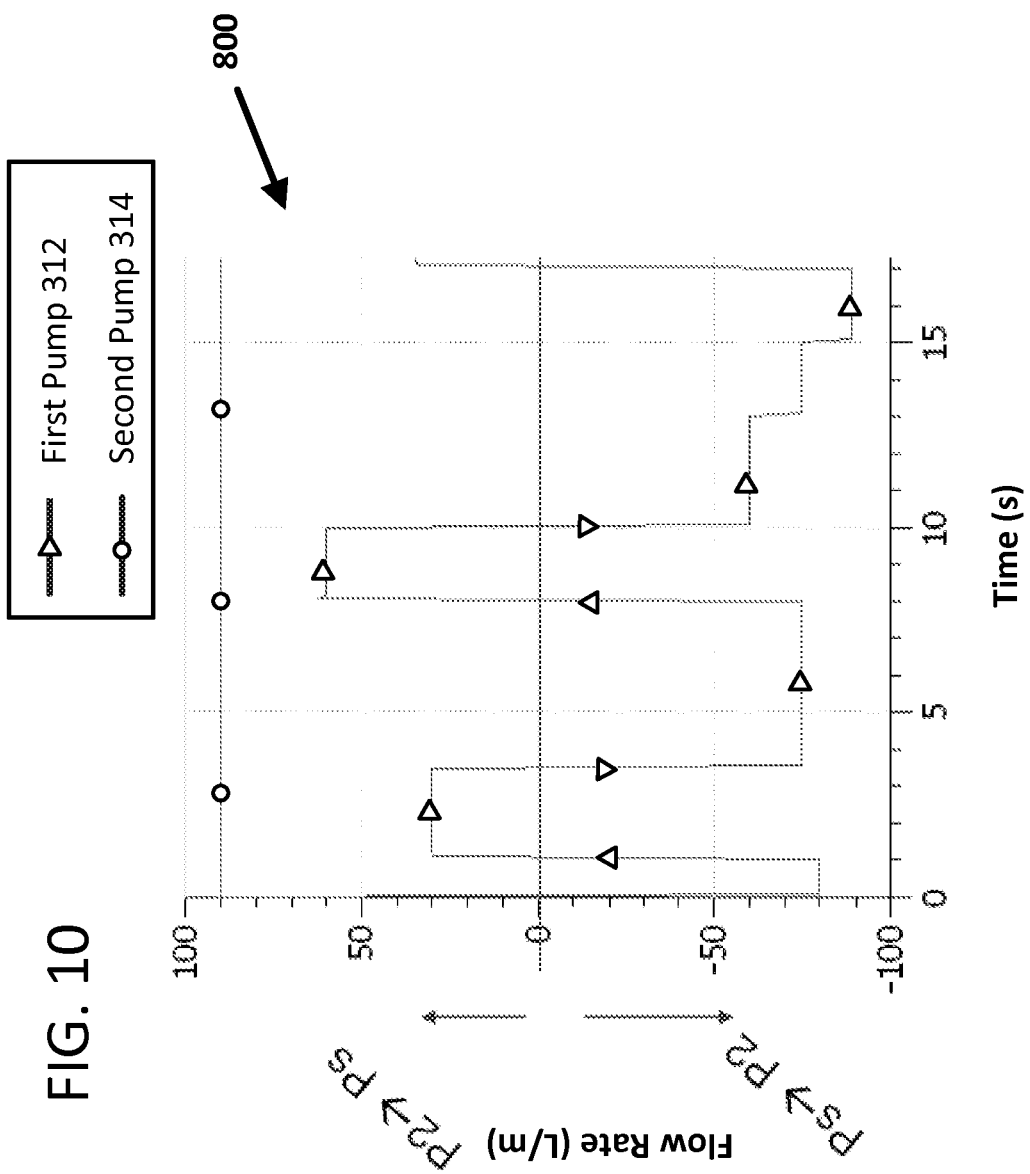
FIG. 10 is a graph charting the fluid flow to the supply line $P_S$ from each pump over time in an example hydraulic system having an example load profile over an example duty cycle.

FIG. 10 is a graph 800 charting the fluid flow (L/m) to the supply line $P_S$ from each pump 312, 314 over time (s) in an example hydraulic system having an example load profile over an example duty cycle. The graph values were produced in a numerical simulation. Since the graph 800 is presented to portray general trends in the fluid flow during the various drive modes, the raw numbers obtained from the simulation are unimportant to this disclosure.

The graph 800 shows the fluid rate of the first pump 312 (circle line) remaining constant throughout the duty cycle while the fluid output rate of the second pump 314 (triangle line) varies over the duty cycle. In particular, the fluid rate of the second pump 314 drops below zero (e.g., 0 mL/sec) during portions of the duty cycle. As indicated in FIG. 8, the fluid rate of the second pump 314 is positive when the second pump 314 is directing fluid from the feeder line F to the supply line $P_S$ (e.g., when the second pump 314 is drawing fluid from the reservoir 305 or the accumulator 340). The fluid rate of the second pump 314 is negative when the second pump 314 is directing fluid from the supply line $P_S$ to the feeder line F (e.g., to charge the accumulator 340).

During times in the system duty cycle when the load requirements of the load section 330 are below a first predetermined threshold, however, the ECU 316 provides a control signal U1 instructing the second pump 314 to direct fluid from the supply line $P_S$ to the feeder line F. Furthermore, the ECU 318 provides a second control signal U2 instructing the directional valve 320 to connect the feeder line F to the accumulator 340. Accordingly, the second pump 314 is effectively directing at least a portion of the fluid from the supply line $P_S$, through the feeder line F, to the accumulator 340 to charge the accumulator 340.

Figure 11:
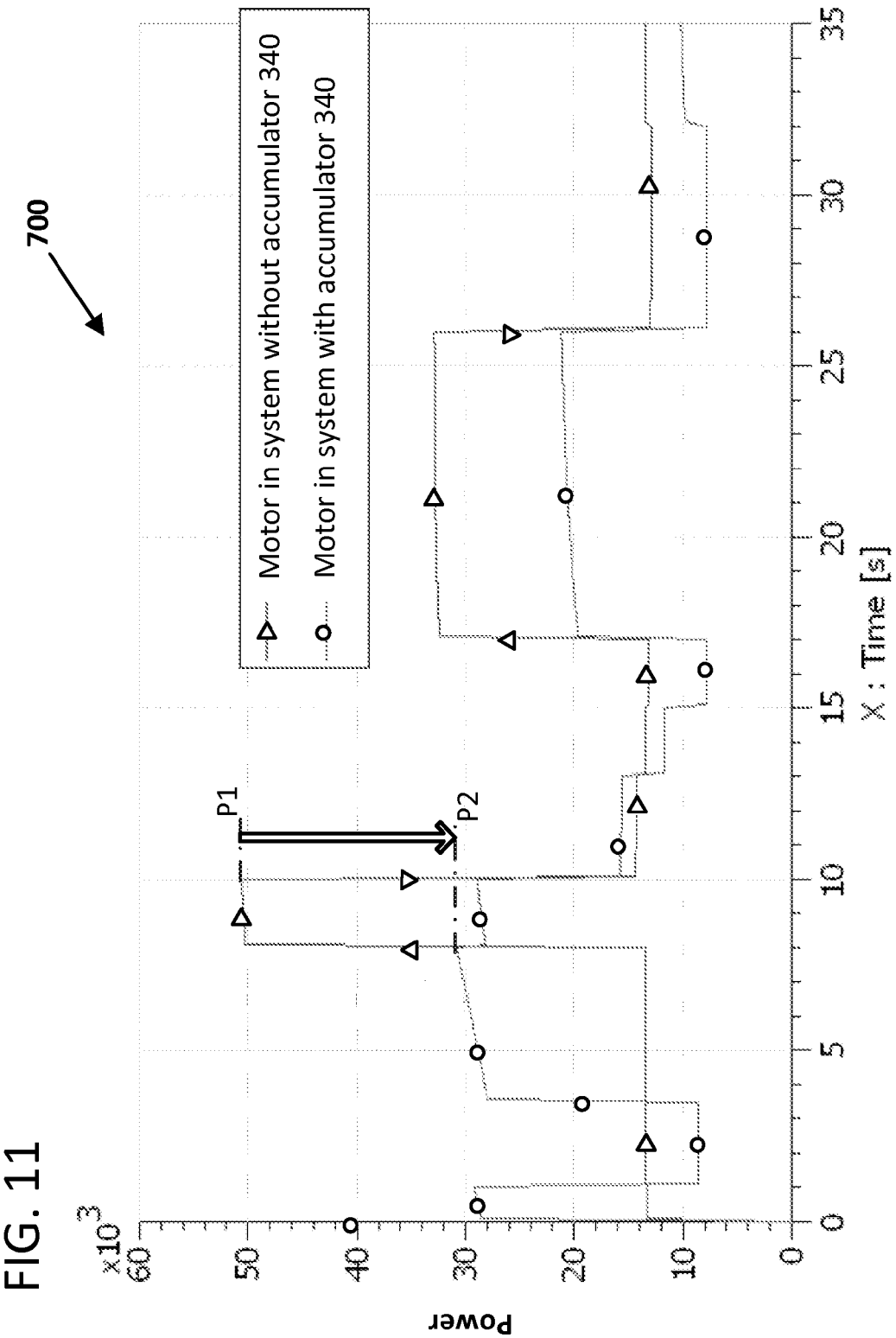
FIG. 11 is a graph depicting the difference in peak power supplied by the motor to operate the pumps between a hydraulic drive system without an accumulator (triangle line) and a hydraulic drive system having an accumulator (circle line)

FIG. 11 is a graph 700 depicting the difference in peak power supplied by the motor 310 to operate the pumps 312, 314 between a hydraulic drive system without an accumulator (triangle line) and a hydraulic drive system having an accumulator (circle line). The graph values were produced in a numerical simulation for an example hydraulic system having an example load profile over an example duty cycle. Since the graph 700 is presented to portray how the addition of an accumulator 340 generally affects the power requirements for the motor 310, the raw numbers obtained from the simulation are unimportant to this disclosure.

As can be seen, the electric motor outputs a first level of power P1 to operate the pumps 312, 314 of the drive circuit 300 if the accumulator 340 is not utilized. The electric motor outputs a second level of power P2 to operate the pumps 312, 314 of the drive circuit 300 if the accumulator 340 is utilized. The second power level P2 is less than the first power level P1 (see arrow). Accordingly, when the accumulator 340 is added to drive circuit 300, the size of the motor 310 may be reduced in comparison to the motor 310 necessary when the drive circuit 300 does not include the accumulator 340. Reducing the motor size has multiple benefits. First, smaller motors tend to be less costly to purchase and maintain. Second, reducing the range of power required to be output by the motor enables the motor to operate within its ideal operating range more often, which increases the efficiency of the motor.

Figure 12:
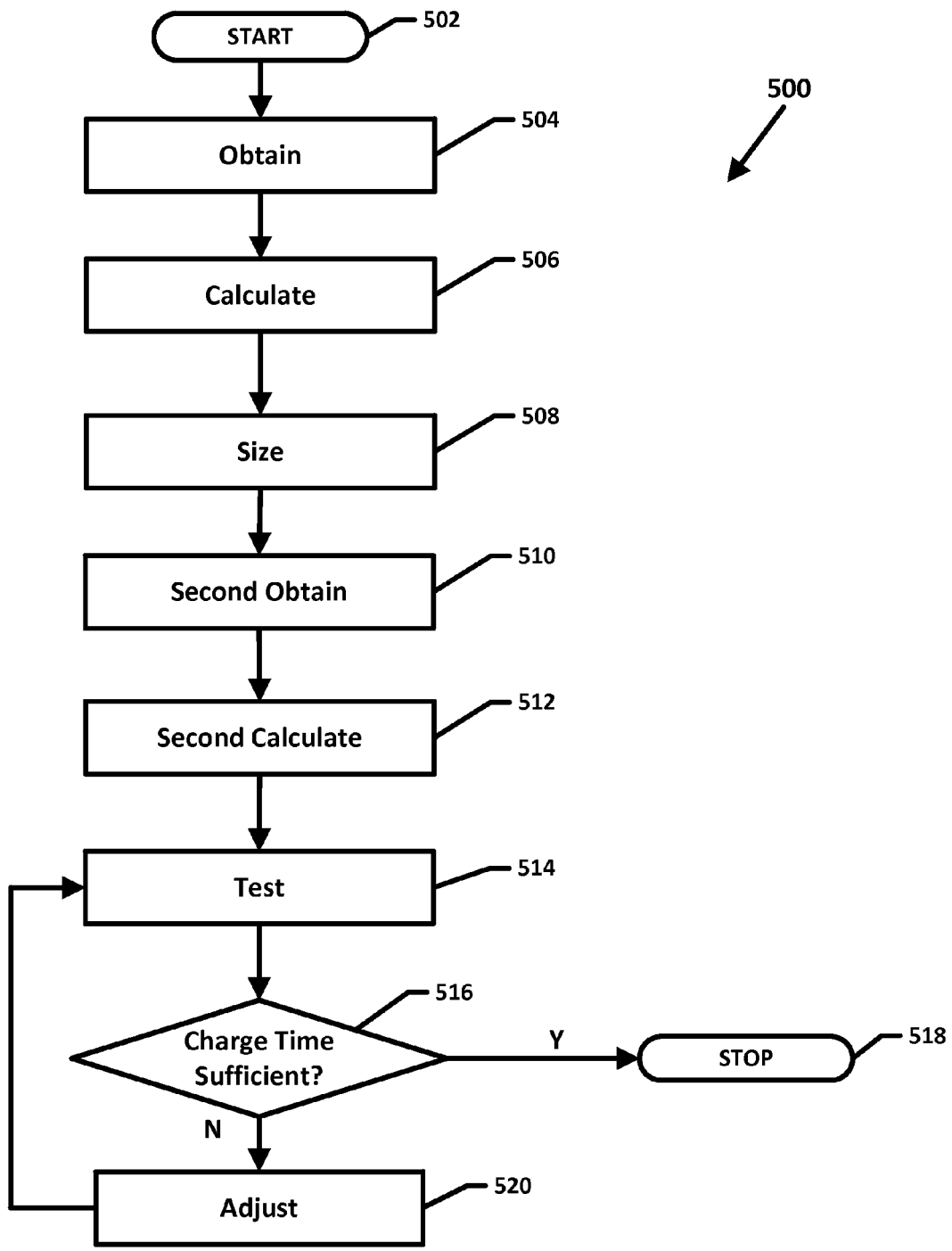
FIG. 12 is a flowchart illustrating an operational flow for an example design and selection process by which the pump arrangement of FIG. 3 of a hydraulic system is designed and programmed.

FIG. 12 is a flowchart illustrating an operational flow for an example design and selection process 500 by which the pump arrangement 300 of FIG. 3 of a hydraulic system is designed and programmed. For example, in some implementations, the selection process 500 may be used to program the ECUs 316, 318. In certain implementations, the selection process 500 may be used to size the pumps 312, 314. The example selection process 500 begins at a start module 502, performs any appropriate initialization procedures, and proceeds to an obtain operation 504. The obtain operation 504 acquires a load profile for the hydraulic system. The load profile shows the change in load requirements of a load section of the hydraulic system over a duty cycle of the hydraulic system. For example, in some implementations, the obtain operation 504 runs a numerical simulation of the hydraulic system to map the power requirements.

A calculate operation 506 determines an average or median load required during the duty cycle of the hydraulic system. A size operation 508 determines the size requirements for the pump arrangement 300 to meet the average or median load requirements. For example, the size operation 508 determines an appropriate size for the first pump 312 and an appropriate size for the second pump 314. In some implementations, the size operation 508 selects pumps 312, 314 sized to provide more than the average load, but significantly less than the maximum required load. In other implementations, the size operation 508 selects pumps 312, 314 sized to provide the average load.

A second obtain operation 510 acquires a flow profile for the hydraulic system including the selected pumps 312, 314 over the duty cycle. The flow profile is based on the utilization of the pumps 312, 314 as sized in operation 508 without any accumulator. For example, in some implementations, the second obtain operation 510 runs a numerical simulation of the hydraulic system to map the fluid flow from the pumps 312, 314 to the load section 330 of the hydraulic system.

A second calculate operation 512 determines an appropriate first threshold power level T1 and an appropriate second threshold power level T2 based on the power profile and the flow profile. A control unit of the hydraulic system is set to charge the accumulator 340 when the load requirement drops below the first threshold level and to discharge the accumulator 340 when the load requirement rises above the second threshold level. The control unit isolates the accumulator 340 when the load requirement is between the first and second thresholds. The first threshold T1 is set at a value falling below the lowest power peak that would be required of the VDP pump system. The second threshold T2 is set at a value falling below the highest power peaks that would be required of the VDP pump system, but well above the lower peaks. In certain implementations, the threshold levels T1, T2 are set so that the power requirements of the hydraulic system fall within the normal load range during a majority of the duty cycle.

The flow constraints of the system (e.g., the first and second thresholds T1, T2) are assessed by test operation 514. For example, the test operation 514 may run another numerical simulation for the hydraulic system over the duty cycle. In the numerical simulation run by test operation 514, the hydraulic system includes both the pumps 312, 314 and the accumulator 340. The accumulator 340 in the numerical simulation is charged, isolated, and discharged based on the first and second threshold levels.

A determination module 516 checks the results of the numerical simulation performed by the test operation 514 against one or more flow constraints. For example, in some implementations, the determination module 516 checks whether the amount of fluid directed to the accumulator 340 during charging is about equal to the amount of fluid directed to the accumulator 340 during discharging so that the change pressure in the accumulator 340 over the duty cycle satisfies the following equation:

$$\int_O^T Qaccdt = \sum_{p \in charge} \int Qacc, pdt + \sum_{p \in discharge} \int Qacc, pdt = 0$$

If the determination module 516 determines that the first threshold is set sufficiently high so that the volume of fluid being forwarded to the accumulator 340 during charging is at least as large as the volume of fluid required to be discharged from the accumulator 340 during the duty cycle, then the selection process 500 performs any appropriate completion procedures and ends at a stop module 518. If the determination modules 516 determines that an insufficient amount of fluid is being forwarded to the accumulator 340 during charging, however, then the first threshold level is increased at an adjust operation 520 and the selection process 500 cycles back to the test operation 514 to begin again.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A hydraulic drive system for driving a load, the hydraulic drive system comprising:
 a drive shaft;
 first and second hydraulic pumps driven by the drive shaft, at least the second hydraulic pump being a variable displacement bidirectional pump, the first hydraulic pump having an outlet in fluid communication with a supply line that connects to the load and an inlet in fluid communication with a reservoir, the second hydraulic pump having a first pump port in fluid communication with the supply line and a second pump port selectively in fluid communication with the reservoir and with a hydraulic fluid accumulator;
 a control system that operates the hydraulic drive system in a plurality of modes including: a) a first mode where the second hydraulic pump pumps hydraulic fluid from the supply line to the accumulator; b) a second mode where the second hydraulic pump pumps hydraulic fluid from the accumulator to the supply line; c) a third mode where the second hydraulic pump pumps hydraulic fluid from the supply line to the reservoir; and d) a fourth mode where the second hydraulic pump pumps hydraulic fluid from the reservoir to the supply line.

2. The hydraulic drive system of claim 1, wherein the control system operates the hydraulic drive system in the first mode when the load is below a predetermined lower threshold level and the accumulator is not fully charged.

3. The hydraulic drive system of claim 2, wherein the control system operates the hydraulic drive system in the second mode when the load is above a predetermined upper threshold level.

4. The hydraulic drive system of claim 1, wherein the control system operates the hydraulic drive system in the third mode when the load is below a predetermined lower threshold level and the accumulator is fully charged.

5. The hydraulic drive system of claim 3, wherein the control system operates the hydraulic drive system in the fourth mode when the load is between the predetermined upper and lower threshold levels.

6. The hydraulic drive system of claim 1, wherein the drive shaft is rotated by an electric motor.

7. The hydraulic drive system of claim 1, wherein the first hydraulic pump is a fixed displacement hydraulic pump.

8. The hydraulic drive system of claim 1, wherein the control system includes a directional valve having a first valve port in fluid communication with the second pump port, a second valve port in fluid communication with the accumulator and a third valve port in fluid communication with the reservoir.

9. The hydraulic drive system of claim 8, wherein the valve is a three position valve having a first position where the first valve port is connected to the third valve port and the accumulator is isolated form the first valve port, a second position where the second and third valve ports are isolated from the first valve port, and a third position where the first valve port is connected to the second valve port and the third valve port is isolated from the first valve port.

10. A method for operating a hydraulic drive system to drive a load, the hydraulic drive system including first and second hydraulic pumps driven by a common shaft, at least the second pump being a bidirectional pump, the method comprising:
 pumping hydraulic fluid from a reservoir to a supply line with both hydraulic pumps when the load is between an upper threshold level and a lower threshold level;
 pumping hydraulic fluid from the supply line to an accumulator with the second hydraulic pump when the load is below the lower threshold level; and
 pumping hydraulic fluid from the accumulator to the supply line with the second hydraulic pump when the load is above the upper threshold level.

11. The method of claim 10, further comprising pumping hydraulic fluid from the supply line to the reservoir with the second hydraulic pump when the load is below the lower threshold level and the accumulator is fully charged.

12. The method of claim 10, wherein the first hydraulic pump is a fixed displacement pump and the second hydraulic pump is a variable displacement pump.

13. A hydraulic drive system for powering a load, the hydraulic drive system comprising:
 a pump arrangement for pumping hydraulic fluid to a supply line, the pump arrangement being a variable displacement pump driven by an electric motor;
 first and second proportional flow valves positioned in series along the supply line downstream from the variable displacement pump;
 a hydraulic fluid accumulator that connects to the supply line at a location between the first and second proportional flow valves; and
 a valve for selectively connecting the hydraulic fluid accumulator in fluid communication with the pump arrangement and for isolating the hydraulic fluid accumulator from the pump arrangement.

14. Then hydraulic drive system of claim 13, further comprising a relief valve that connects to the supply line at a location between the accumulator and the first proportional flow valve.

15. The hydraulic drive system of claim 13, wherein the pump arrangement includes the fixed displacement pump driven by the variable frequency drive, wherein a proportional flow valve is positioned on the supply line downstream from the fixed displacement pump, and wherein the accumulator connects to the supply line between the proportional flow valve and the fixed displacement pump.

16. The hydraulic drive system of claim 15, further comprising a relief valve that connects to the supply line at a location between the accumulator and the fixed displacement pump.

17. The hydraulic drive system of claim 13, wherein the pump arrangement includes a first pump and a second pump, wherein the second pump is the variable displacement pump driven by the electric motor, wherein the variable displacement pump is a bi-directional pump, wherein the first and second pumps are both driven by a common drive shaft, wherein the first and second pumps both have first ports in fluid communication with the supply line, and wherein the second pump has a second port selectively in fluid communication with the hydraulic fluid accumulator.

18. The hydraulic drive system of claim 17, wherein the first pump has a second port that is always in fluid communication with a reservoir, and wherein the second port of the second pump is selectively in fluid communication with the reservoir.

19. A hydraulic drive system for powering a load, the hydraulic drive system comprising:
   a pump arrangement for pumping hydraulic fluid to a supply line, the pump arrangement including a first pump and a second pump that are both driven by a common drive shaft, the first and second pumps both having first ports in fluid communication with the supply line, the second pump being a variable displacement, bi-directional pump driven by an electric motor, the second pump having a second port;
   a hydraulic fluid accumulator with which the second port of the second pump is selectively in fluid communication; and
   a valve for selectively connecting the hydraulic fluid accumulator in fluid communication with the pump arrangement and for isolating the hydraulic fluid accumulator from the pump arrangement.

20. The hydraulic drive system of claim 19, wherein the first pump has a second port that is always in fluid communication with a reservoir, and wherein the second port of the second pump is selectively in fluid communication with the reservoir.

* * * * *